(12) United States Patent
Lohberg et al.

(10) Patent No.: US 6,434,451 B1
(45) Date of Patent: Aug. 13, 2002

(54) MOTION SENSOR FOR A MOTOR VEHICLE

(75) Inventors: Peter Lohberg, Friedrichsdorf; Jochen Burgdorf, Offenbach; Roland Burghardt, Frankfurt am Main; Heinz Loreck, Idstein, all of (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 0 days.

(21) Appl. No.: 09/646,334
(22) PCT Filed: Mar. 17, 1999
(86) PCT No.: PCT/EP99/01758
   § 371 (c)(1),
   (2), (4) Date: Feb. 20, 2001
(87) PCT Pub. No.: WO99/47889
   PCT Pub. Date: Sep. 23, 1999

(30) Foreign Application Priority Data

Mar. 18, 1998 (DE) .......................... 198 11 547

(51) Int. Cl.[7] .............................. G01C 19/56; B62D 6/00
(52) U.S. Cl. ............................................................ 701/1
(58) Field of Search ................................. 701/1, 37, 82; 303/140, 146; 73/504.16, 504.03, 504.04

(56) References Cited

U.S. PATENT DOCUMENTS 5,826,204 A * 10/1998 Ulm ............................... 704/1
6,151,965 A * 11/2000 Watarai ..................... 73/504.16

FOREIGN PATENT DOCUMENTS

| DE | 196 21 320 | 12/1997 |
| EP | 0 642 216 | 3/1995 |

* cited by examiner

Primary Examiner—Michael J. Zanelli
(74) Attorney, Agent, or Firm—Rader, Fishman & Grauer PLLC

(57) ABSTRACT

The invention discloses a system, preferably for influencing the performance of a motor vehicle, comprising a sensor unit with an electric-mechanical transducer and a mechanical-electric transducer with signal recording amplifier, wherein such sensor unit is connected to an A/D signal converter by way of an output and to a b/A signal converter of a digital signal processing unit by way of an input.

19 Claims, 2 Drawing Sheets

MOTION SENSOR FOR A MOTOR VEHICLE

TECHNICAL FIELD

The present invention generally relates to vehicle control systems and more particularly relates to a system, preferably for influencing the performance of a motor vehicle.

BACKGROUND OF THE INVENTION

Systems for controlling or regulating many different variables regarding the vehicle dynamics of a motor vehicle are becoming increasingly complex, since more and more new functions are being implemented in motor vehicles. Brake-control systems (ALS), traction control systems (TCS), steering control systems, chassis control systems, vehicle-dynamics control systems and motor management systems are well-known examples of such systems.

What these systems have in common is that they require information regarding the movement of the vehicle in relation to the road. For this purpose, appropriate sensors are employed to measure the vehicle's longitudinal and transversal movements as well as the yawing motion of the vehicle.

Rate of rotation or rate of yaw sensors using the coriolis force are used for determining the movement about the vertical axis of the vehicle. In general such sensors have a movable mechanical structure comprising an electric-mechanical transducer excited for periodic oscillations. When the sensor detects a rotation about an axis vertical to the excited oscillation, the movement of the oscillation leads to a coriolis force that is proportional to the measured variable, i.e. the angular velocity. Through the coriolis force a second oscillation, orthogonal relative to the excited oscillation, is excited in a mechanical-electric transducer. This second oscillation can be detected by various measuring procedures, with the detected variable serving as the measure for the rate of rotation acting on the rate of rotation sensor.

A known rate of rotation sensor 100 is shown in FIG. 1. The rate of rotation sensor shown here exhibits an electric-mechanical transducer 101 and a mechanical-electric transducer 102, whose mechanical structure is designed as a quartz tuning fork. An excitation amplifier 103 (oscillator) excites a fundamental oscillation of the quartz in the electric-mechanical transducer. The current flowing through the electric-mechanical transducer is measured by a current-voltage converter 104 and returned to the input of the excitation amplifier 103, which always switches at the zero passage transition with an hysteresis.

The sensitivity of the electric-mechanical transducer 101 depends on the mechanical amplitude of oscillation of the tuning fork. In order to obtain a defined sensitivity of the rate of rotation sensor, the amplitude of oscillation is stabilized with respect to the effects of temperature and aging. For this purpose, it is necessary to measure the amplitude of oscillation. This can be done by means of additional components or the current-voltage converter 104, whose output signal, following a full-wave rectification 105 with subsequent filtering, provides a d.c. voltage signal that is proportional to the amplitude of the electric-mechanical transducer 101. The control deviation is determined by integrating a subtractor in the full-wave rectifier 105.

The actual control element is a PI controller 106 in order to achieve as low control deviations of the amplitude of oscillation as possible.

The electric-mechanical transducer 101 is firmly and mechanically connected to mechanical-electric transducer 102 which is designed in the same way as the electric-mechanical transducer and also consists of quartz. The mechanical-electric transducer 102 provides a signal having the same oscillation frequency as the excited electric-mechanical transducer 101; however, its amplitude is proportionally dependent on the rate of rotation. This concerns the oscillation that was amplitude-modulated through the rate of rotation, with two side bands and suppressed carrier. Parasitic signals are superimposed by unbalances between the electric-mechanical transducer and the mechanical-electric transducer and capacitive overcoupling between the lines and electrodes. The tuning-fork-shaped mechanical-electric transducer provides a charge as signal that is preamplified in a signal recording amplifier 107 as the first input step. The signal is further amplified in a multistage amplifier 108 due to the low signal amplitude. In a synchronous rectifier 109, which is activated by the excitation signal, the modulated signal is transformed into a rectified rate of rotation signal. This is necessary because the amplitude of the modulated signal contains the amount of the rate of rotation, the phase contains the sign. The synchronous rectifier is an effective filter for interference signals with shifted phases. The desired rate of rotation signal is available following the synchronous rectification. In a last amplifier stage 110, undesired higher frequency residual signals are dampened by means of a low pass and the scaling is set to the desired output voltage range of about 5 Volt by means of amplification.

These types of rate of rotation or rate of yaw sensors are well known. Cylinders, prisms, tuning forks, micromechanically produced elements of silicon or quartz are used as transducer bodies (vibration bodies). Just as there are many different designs for transducer bodies, so there are various designs for the analog switching elements related to the transducer bodies in the sensor housing 111, which are designed according to the transducer body, its material, the excitation frequency, etc.

Thus, the rate of rotation sensor described in more detail as an example of sensors comprises analog subassemblies with firmly defined scopes of function: e.g. excitation, rectification, amplification, filtering, etc. The result of the sensors is then provided for further processing to a common interface, to which an evaluation unit that controls the driving dynamics of the motor vehicle can be connected.

In the past these hardware functions required a relatively large constructional volume and resulted in high costs. Furthermore, they had the disadvantage that the user could not, or only with great difficulty, make any changes in the analog hardware functions of the sensor and thus strongly limited the flexibility for the user. It is not necessary to integrate additional functions such as, for example, suppression of resonance characteristics of the transient response characteristics. In addition, the stability of the analog hardware functions can be attained only at high costs.

It is well known that at least two sensors for detecting the movements of the motor vehicle are related to an evaluation unit for evaluating the signals of the sensor units, with this evaluation unit being combined with the sensors to form a sensor module. The sensors are well-known longitudinal and/or transversal acceleration sensors and/or commercially available rate of rotation sensors. In the evaluation unit interference induced by the motor vehicle is filtered, temperature effects are compensated and the sensor signals are transformed to any point of the motor vehicle.

It is the object of the present invention to provide a system that allows significantly more flexible signal processing and ensures higher long-term stability.

Due to the fact that the system consists of an electric-mechanical transducer and a mechanical-electric transducer with a sensor unit comprising a signal recording amplifier, which is connected to an A/D signal converter by way of an output and to a D/A signal converter of a digital signal processing unit by way of an input, the interface and the consistent distribution of the functions into a purely sensor-related sensor unit and a purely evaluation-related signal processing unit are achieved. A significant feature of the system according to the present invention is the low number of electronic operating switching operations or analog switching elements required for the transducers. The fine-mechanically or micromechanically formed transducer bodies used for rate of rotation sensors, which make use of electric-physical effects to generate electric, sensoric signals from micro-movements or, vice versa, respond to electrically provided signal energy with micro-movements generate a charge in the form of a signal as a control deviation and for this reason the sensor unit, being the smallest analog constructional element, exhibits a signal amplifier as first input step. Preferably the sensor unit also exhibits an excitation amplifier that is connected to the electric-mechanical transducer, which ensures the oscillation frequency of the electric-mechanical transducer (quartz body). The dimensions of the system are such that the oscillation condition is fulfilled at the resonance frequency of the electric-mechanical transducer.

One advantage of the present invention as compared to the state of the art is that the sensor unit has a simple design due to the division of the functions into a sensor-related and evaluation-related unit or functional group, as was described above. Thus, all components needed for the evaluation are concentrated in the signal processing unit. Hence, the sensor unit can be produced at low cost, which promotes modular application of the system. The replacement for new sensors also is reduced considerably since only the sensor unit has to be replaced and the signal processing unit can be adapted accordingly.

By separating the evaluation-related functional group, the signal processing is rendered more flexible, whereby the tolerances of sensor units can be calibrated according to the application.

Application of the system has proven advantageous when the motion of rotation or yawing motion of a motor vehicle needs to be detected. Essentially it consists of two separate units, operated with electric energy, with electric energy permanently being transformed into analog mechanical movement in the first sensor unit and mechanical movement being transformed into analog electric energy at the same time. In the second signal processing unit electric energy is transformed exclusively into digital signal energy. The two units are electrically combined by means of at most three lines, so that the signal processing unit influences the transformation of electric energy into mechanical energy within the sensor unit according to function-specific algorithms and, at the same time, the electric energy generated from the mechanical energy in the sensor unit influences the function-specific algorithms in the signal processing unit. In this connection, the sensor unit, under the influence of motion of rotation and yawing motion of a motor vehicle, changes its electric energy output analogously to the yawing motion; and the signal processing unit generates electrically coded numeric values corresponding to these yawing motions by means of computing operations, but, at the same time, controls their causality and correctness by means of internal comparisons and subsequently converts the figures into the format for a databus and feeds them to a bus controller whose electrical network also is part of the signal processing unit. Therefore, the signal processing unit comprises additional electrical connections, the number of which corresponds to the requirements of the databus used and which can be used to establish an electric connection to a bus drive. According to a preferable embodiment, the working range of the sensor unit at the signal output does not exceed the 2 Volt, preferably 1 Volt, of the signal representing the yawing motion of the motor vehicle. For this purpose, the electronic circuit in the sensor unit is limited to the minimum required to dissolve the range of the electric energy output changed through the yawing motion to $1/1000^{th}$ for a signal-to-noise ratio of 1:1.

Preferably the signal processing unit excites the electric-mechanical transducer with an excitation signal having a frequency of 1 kHz to 50 kHz in such a way that the transducer oscillates at a constant amplitude. Since the sensor unit and signal processing unit interact, the sensor unit is influenced by the signal processing unit in such a way that the electric energy is converted to mechanical energy at a preferably high frequency sequence but equal intensity, and the sensor unit influences an algorithm in the signal processing unit with an equally high frequency sequence but with an intensity changing according to the yawing motion. Such algorithm multiplies the time-related intensity values with each other and weights the results mathematically after a digital filter function, such as a low-pass function, to suppress the numeric effects of the high frequency sequence. For this purpose, the low-pass function filters the frequencies of the excitation signal, i.e. the algorithm suppresses numeric values with a low-pass damping of min. 20 dB/decade, if the intensity caused by the yawing motion changes more rapidly than 30 Hz.

Through another filter function the signal processing unit filters resonance frequencies of the digital variables between 50 and 60 Hz, i.e. the algorithm suppresses numeric values of the changing intensity with min. 60 dB, with such numeric values having been caused by the yawing motion in the frequency range between 50 to 6000 Hz. Preferably the sensor unit and the signal processing unit form a rate of rotation or yaw rate sensor that inputs a modified analog signal into the signal processing unit according to a yawing motion, with the signal processing unit providing digital values for the yaw angle and/or the yaw velocity and/or the yaw acceleration and/or the first derivation of the yaw acceleration by way of the databus of a further processing unit. A digital TMS 320 C24X signal processor (Texas Instruments) is provided.

DETAILED DESCRIPTION OF THE PREFERRED EMBODIMENTS

Figure 1:
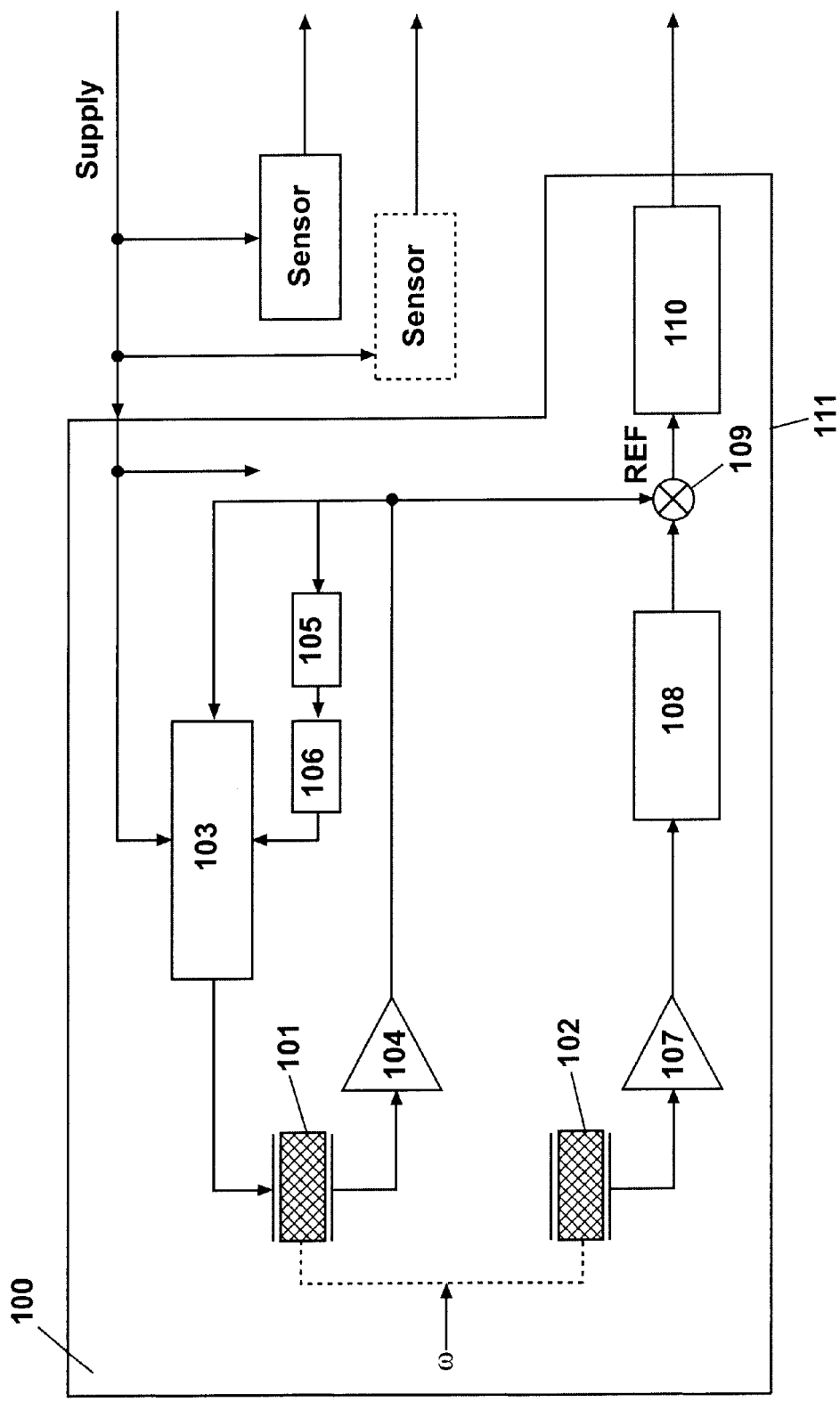
FIG. 1 is a schematic drawing of prior art rate of rotation.
Figure 2:
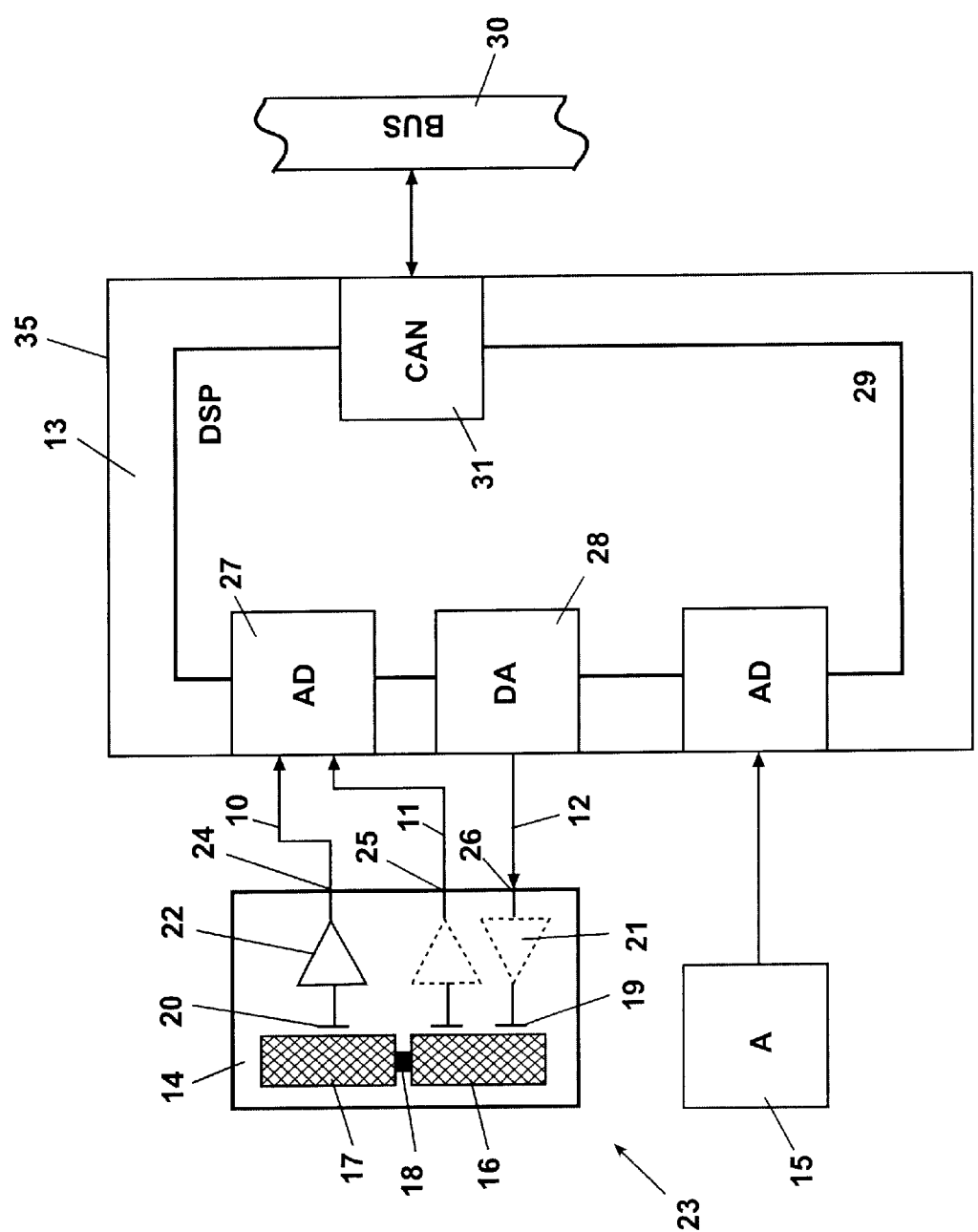
FIG. 2 is the rate of rotation sensor of the present invention.

In FIG. 2 the sensor unit 14 is connected to the signal processing unit 13 by means of at least three lines 10, 11, 12. Two fine-mechanically or micromechanically produced converter bodies 16, 17 that are connected mechanically at 18 are provided in the sensor unit 14. The transducer bodies 16, 17 are fork-shaped at their outer ends, forming the quartz tuning fork required for detecting the yaw motion of a motor vehicle. In the fork-shaped transducer body 16, the fork prongs are excited to oscillate in one spatial direction through electric alternating charges input by electrodes 19;

whereas, at the same time, electric alternating charges caused by the effects of the coriolis force are picked off by electrodes 20. The excitation amplifier 21 (comparator) for oscillating the prong movement and the signal recording amplifier 22 for picking-off the charge generated as a result of the coriolis force make up the sensor unit 14 together with the electric-mechanical transducer 16 and the mechanical-electric transducer 17, both of which are fitted with electrodes. The sensor unit 14 is located in a housing 23 which exhibits at least three line terminals 24, 25, 26. The mechanical-electric transducer 17 is connected to signal processing unit 13 by way of output 24 and the electric-mechanical transducer is connected to signal processing unit 13 by way of input 26, with signal processing unit 13 digitalizing the analog output signal by means of an A/D signal converter 27 and converting the digital output signal into an analog input signal by means of a D/A converter. The electric-mechanical transducer is connected to the A/D converter 27 of the digital signal processing unit by means of feedback line 11. According to an advantageous embodiment, another signal recording amplifier 36 is provided in the sensor unit 14, which amplifies the feedback signal to an analog-digital convertible signal. The signal processing unit 13 arranged in housing 35 comprises an arithmetical/logical unit and a memory, and preferably it is designed as a digital signal processor (DSP). The signal processing unit 13 can also be designed as a microcontroller or programmable logic module.

The signals are available in digital form and they are processed digitally in the digital signal processor 29 in a manner that will be described below. The evaluation-related sensor signals are applied to the output side of the digital signal processor 29. These are supplied to the serial bus system 30 by way of the CAN controller 31 located in the digital signal processor. For this purpose, the digital signal processor with integrated CAN (Controller Area Network) assumes the following system functions:

Providing a drive signal/drive voltage for exciting the electric-mechanical transducer of the sensor unit 14.

Receiving the signals of the mechanical-electric transducer 17 with specific algorithmic computations and filtering in order to obtain a numeric value for the yaw motion of a motor vehicle.

Converting the numeric values of the yaw motion of a motor vehicle in the CAN and transferring the result to the serial bus 30.

The system works in the following manner:

The electric-mechanical transducer is activated by the excitation amplifier 21 (comparator) of the digital signal processor by way of the D/A converter 28. The current flowing through the electric-mechanical transducer 16 is preferably digitalized after having been amplified by a signal recording amplifier 36 by means of A/D conversion. In order to determine the amplitude, the peak value is calculated by searching for the maximum and minimum and subsequently forming the difference in the signal processing unit 13. The digitalized output signal of the A/D converter can also be formed with the root-mean-square value by means of the square root of the sum of all squared values. In addition, the scanning instant of the A/D conversion can be synchronized with the excitation oscillation (oscillator vibration) in such a way that precisely the maximum and minimum are always scanned, and the difference between these two values represents the amplitude. The deviation, which is then a digital set-value, is then formed by means of subtraction. This value is used as input for a proportional-integral control or other control which is calculated in the digital signal processor 29 by means of known algorithms. The value in the digital signal processor then represents the desired control voltage, which is supplied to the excitation amplifier 21 by way of the D/A converter. For this purpose, it is advantageous for the D/A converter 28 to have a pulse-width modulation with subsequent simple RC low-pass filtering in order to minimize the number of required parts.

Depending on the design of the digital signal processor 29, the excitation amplifier 21 (comparator) can be formed through a function within the digital signal processor 29. The digital signal processor 29 then imitates the comparator function by means of algorithms. For this purpose, digital signal processors are used which ensure high data and processing rates that guarantee the accuracy of the oscillation frequency of the quartz. This comparator function also can be ensured by a digital input of the digital signal processor 29. An electric a.c. voltage $A*\sin(\omega t)$ from the signal processing unit 13 is applied to the electric-mechanical transducer 16 by way of the electrodes 19, and this alternating voltage induces in the transducer mechanical vibrations in a first spatial direction with a frequency of 1 kHz to 50 kHz in such a way that the transducer body 16 oscillates at a constant amplitude. When the sensor unit is moved about the axis of rotation or yaw, additional vibrations in a second spatial direction occur at the mechanical-electric transducer 17 under the influence of coriolis forces, and the amplitudes of these vibrations change depending on the yaw rate.

The mechanical-electric transducer 17 supplies an a.c. voltage signal $B(GR)*\sin(\omega t)$ with the same oscillation frequency as the excitation, whose amplitude, however, is proportionally dependent on the rate of rotation. This is the oscillation that was amplitude-modulated through the rate of rotation, with two side bands and suppressed carrier. Parasitic signals are superimposed by unbalances of the tuning fork and capacitive overcoupling between the lines and electrodes. The quartz tuning fork supplies a charge as signal and, therefore, the signal amplifier 22 is necessary, since as a rule the charge signals are so small that they cannot be digitalized directly. Depending on the transducer, load amplifier, current-voltage converter or other components are used. As a rule, the signal should be digitalized as early as possible. The working range of the sensor unit should not exceed 2 Volt, preferably 1 Volt, with the electronic circuit connected to the converters 16, 17 being limited to a minimum that is just necessary to dissolve the range of the electric output of energy modified by the yaw motion of the motor vehicle to $1/1000^{th}$ at a signal-to-noise ratio of 1:1. Preferably the signal is amplified by the signal amplifier to such an extent that an economic 10 Bit A/D converter can be used. With the signal provided by the mechanical-electric converter scanning was performed with an economic A/D converter, followed by digital filtering in the digital signal processor 29 to increase the quantization. Naturally, the quantization can be improved by separating the areas and executing the quantization through different A/D channels or a magnifier function of certain areas.

After the signal of the mechanical-electric transducer 17 is digitalized sufficiently, it is processed further fully digitally in the digital signal processor 29. All filter algorithms of a digital signal processing are available for filtering the raw signal. In addition, special filtering operations, e.g. to suppress resonances, can be carried out, which would be too complex in an analog form. Preferably the signal processing unit 13 systematically outputs signals for feedback to the sensor unit 14 so as to improve its behavior.

There are various ways of solving the synchronous rectification or demodulation. First the synchronous rectifier is imitated in the digital signal processor 29 by means of an algorithm. Naturally, demodulation can be achieved by multiplication and subsequent filtering. In-phase scanning is particularly advantageous, since this involves very little computation work. Due to its flexibility, other solutions, especially such adapted to special needs, can be realized with the digital signal processor. The final signal filtering after the demodulation can also be executed with the digital signal processor.

Preferably additional functions are integrated in the signal processing unit, such as preliminary processing of the signals or monitoring functions. Since the signal already is in a digital state, it can be transmitted without difficulty by way of the bus system 30; the evaluation of the signals provided by sensor unit 14 can be adapted quickly to special conditions in order to follow the further developments of the transducer. With the present invention it is possible to reduce the construction to the reduced analog block integrated in the sensor element or transducer or scanning element and a digital block consisting of only a few individual components.

What is claimed is:

1. A system for sensing motion of a motor vehicle, comprising:

a sensor unit including an electric-mechanical transducer, signal recording amplifier coupled to an output of said electric-mechanical transducer, wherein such sensor unit modifies an electric output signal analogously to a yaw motion under the influence of the motion of rotation or yaw motion of a motor vehicle, an A/D signal converter connected to said electrical output signal of said sensor unit, a D/A signal converter connected to an output of said A/D signal converter, and means for interfacing an output of said D/A signal converter to a databus.

2. A system according to claim 1, wherein the electric-mechanical transducer operates in a resonant mode.

3. A system according to claim 1, wherein the sensor unit includes an excitation amplifier for driving the electric-mechanical transducer.

4. A system according to claim 3, wherein the input of the A/D signal converter is connected to an output of the signal recording amplifier and the output of the D/A signal converter is connected to an input of the excitation amplifier of the electric-mechanical transducer by way of a control line, wherein the electric-mechanical transducer is connected to an input of said A/D by means of a feedback line.

5. A system according to claim 1, wherein said electric output signal of said sensor unit does not exceed 2 volts.

6. A system according to claim 1, wherein the sensor unit resides in a first housing and said A/D and said D/A reside in a second housing, and wherein said first and second housings are connected by means of at least three control lines.

7. A system according to claim 1 wherein said means for interfacing further includes an arithmetical and logical unit and a memory.

8. A system according to claim 1, wherein said A/D, said D/A, and said means for interfacing together form a signal processing unit, wherein all functions of said A/D, D/A and said means for interfacing are all implemented by using at least one of a microcontroller, digital signal processor and programmable logic module.

9. A system according to claim 8, wherein said signal processing unit excites the electric mechanical transducer with an excitation signal having a frequency of 1 kHz to 50 kHz in such a way that the transducer amplitude.

10. A system according to claim 8, wherein the signal processing unit implements at least one filter function or one mixing function.

11. A system according to claim 8, wherein the A/D converter provides the signal resulting from the motion of rotation of the sensor unit as a digital signal, and that a feedback signal is multiplied with the signal or modified signal in the signal processing unit.

12. A system according to claim 11, wherein the signal processing unit weights the value obtained with the multiplication according to a digital filter function.

13. A system according to claim 12, wherein the filter function filters the frequencies of an excitation signal to the electric-mechanical transducer.

14. A system according to claim 8, wherein the signal processing unit exhibits a filter function to filter resonance frequencies of the digital variable between 50 and 600 Hz. excitation signal to the electric-mechanical transducer.

15. A system according to claim 8, wherein the sensor unit together with the signal processing unit is a yaw rate sensor, which inputs a modified analog signal into the signal processing unit according to the yaw motion, with such signal processing unit providing the digital values for a yaw angle and/or a yaw velocity and/or a yaw acceleration and/or the first derivation of the yaw acceleration via the databus of a further processing unit.

16. A system according to claim 8, further including additional sensor units connected to the signal processing unit.

17. A system according to claim 1, further comprising a mechanical-electrical transducer mechanically coupled to the electric-mechanical transducer, wherein a signal or modified signal is applied to the input of the A/D signal converter whenever a motion of rotation acts on the sensor unit.

18. A system according to claim 1, wherein the sensor unit resolves the range of the signal generated or modified by the motion of rotation to $1000^{th}$ at a signal-to-noise ratio of 1:1.

19. A system according to claim 1, wherein said system is arranged in a motor vehicle.

* * * * *

UNITED STATES PATENT AND TRADEMARK OFFICE
CERTIFICATE OF CORRECTION

PATENT NO.   : 6,434,451 B1
DATED        : August 13, 2002
INVENTOR(S)  : Peter Lohberg et al.

It is certified that error appears in the above-identified patent and that said Letters Patent is hereby corrected as shown below:

<u>Column 8,</u>
Line 1, change "according to claim 1 wherein" to -- according to claim 1, wherein --.
Line 11, change "excites the electric mechanical" to -- excites the electric-mechanical --.
Line 13, change "the transducer amplitude." to -- the transducer oscillates at a constant amplitude. --
Lines 31-32, change "between 50 and 600 Hz. Excitation signal to the electric mechanical transducer." to -- between 50 and 600 Hz. --
Line 52, change "of rotation to 1000$^{th}$" to -- of rotation to 1/1000$^{th}$ --.

Signed and Sealed this

Twenty-fifth Day of February, 2003

JAMES E. ROGAN
*Director of the United States Patent and Trademark Office*